United States Patent
Lange et al.

(10) Patent No.: US 8,539,436 B2
(45) Date of Patent: Sep. 17, 2013

(54) SYSTEM AND METHOD FOR RULE-BASED DISTRIBUTED ENGINEERING

(75) Inventors: Ronald Lange, Fürth (DE); Ralf Leins, Ispringen (DE); Klaus Meusser, Fürth (DE); Jürgen Schmoll, Markt Berolzheim (DE); Markus Weinländer, Happurg (DE)

(73) Assignee: Siemens Aktiengesellschaft, München (DE)

( * ) Notice: Subject to any disclaimer, the term of this patent is extended or adjusted under 35 U.S.C. 154(b) by 1633 days.

(21) Appl. No.: 11/313,129

(22) Filed: Dec. 20, 2005

(65) Prior Publication Data

US 2006/0156275 A1 Jul. 13, 2006

(30) Foreign Application Priority Data

Dec. 21, 2004 (EP) .................................. 04030318

(51) Int. Cl.
*G09F 9/33* (2006.01)

(52) U.S. Cl.
USPC ............................. 717/101; 717/100; 717/103

(58) Field of Classification Search
USPC ................................................ 717/100–103
See application file for complete search history.

(56) References Cited

U.S. PATENT DOCUMENTS

| | | | | |
|---|---|---|---|---|
| 5,844,554 A * | 12/1998 | Geller et al. | ................... | 715/744 |
| 5,996,114 A * | 11/1999 | Moeller | ........................ | 714/699 |
| 6,064,982 A * | 5/2000 | Puri | ............................ | 705/26.41 |
| 6,158,044 A * | 12/2000 | Tibbetts | ......................... | 717/100 |
| 6,247,128 B1 * | 6/2001 | Fisher et al. | .................. | 713/100 |
| 6,321,204 B1 * | 11/2001 | Kazami et al. | ............... | 705/7.22 |
| 6,456,997 B1 * | 9/2002 | Shukla | ..................................... | 1/1 |
| 6,546,350 B1 * | 4/2003 | Hartmann et al. | ............ | 702/119 |
| 6,934,931 B2 * | 8/2005 | Plumer et al. | .................. | 717/104 |
| 7,219,081 B1 * | 5/2007 | Davis et al. | ..................... | 705/37 |
| 7,278,130 B2 * | 10/2007 | Iborra et al. | ..................... | 717/101 |
| 7,302,674 B1 * | 11/2007 | Gladieux et al. | .............. | 717/101 |
| 7,337,124 B2 * | 2/2008 | Corral | .......................... | 705/7.17 |
| 7,430,498 B2 * | 9/2008 | Butterfield et al. | ............... | 703/2 |
| 7,529,814 B2 * | 5/2009 | Wadia et al. | ................... | 709/220 |
| 7,720,794 B2 * | 5/2010 | Wood | ............................ | 707/796 |
| 2003/0188290 A1 * | 10/2003 | Corral | ........................... | 717/101 |
| 2003/0204791 A1 * | 10/2003 | Helgren et al. | .................. | 714/48 |
| 2004/0010772 A1 * | 1/2004 | McKenna et al. | ............. | 717/101 |
| 2004/0064805 A1 * | 4/2004 | Sparago et al. | ............... | 717/120 |

(Continued)

OTHER PUBLICATIONS

Giorgio Filippi, Paola Sivera and Franco Carbognani, "Software Engineering Practices for the ESO VLT Programme", Astronomical Data Analysis Software and Systems X, ASP Conference Series, vol. 238, 2001, pp. 199-208.

(Continued)

*Primary Examiner* — Wei Zhen
*Assistant Examiner* — Matthew Brophy

(57) ABSTRACT

The invention relates to a system and a method for providing specifications for a project, in particular for an engineering project for creating an automation solution. The system comprises first means for creating a file containing the specifications and at least one project planning environment for creating a solution on the basis of the specifications, with the file containing the specifications being imported into the at least one project planning environment as meta knowledge. A simple provision of specifications to be used for a project is hereby enabled.

8 Claims, 2 Drawing Sheets

(56) References Cited

U.S. PATENT DOCUMENTS

| | | | |
|---|---|---|---|
| 2004/0221256 A1* | 11/2004 | Martin et al. | 717/101 |
| 2004/0237065 A1* | 11/2004 | Brousek et al. | 717/101 |
| 2004/0243968 A1* | 12/2004 | Hecksel | 717/100 |
| 2005/0114829 A1* | 5/2005 | Robin et al. | 717/101 |
| 2005/0125769 A1* | 6/2005 | McGovern et al. | 717/102 |
| 2006/0156275 A1* | 7/2006 | Lange et al. | 717/101 |

OTHER PUBLICATIONS

Fevzi Belli and Radu Crisan, "Towards Automation of Checklist-Based Code-Reviews", IEEE, Oct. 30-Nov. 2, 1996, pp. 24-33, XP 020202910.

Stephen S. Yau, Yeou-Wei Wang, Jules G. Huang and Jinshuan E. Lee, "An Integrated Expert System Framework for Software Quality Assurance", IEEE, Nov. 1990, pp. 161-166.

* cited by examiner

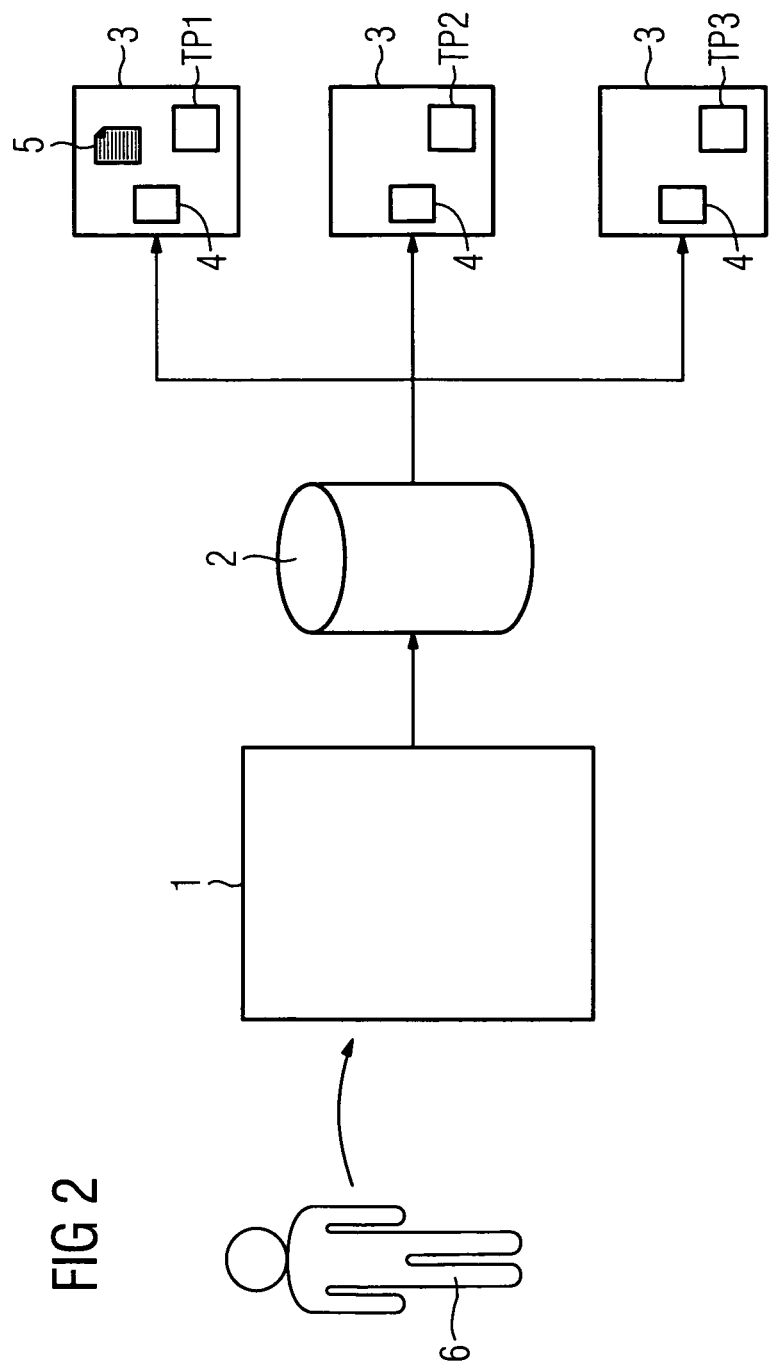

SYSTEM AND METHOD FOR RULE-BASED DISTRIBUTED ENGINEERING

CROSS REFERENCE TO RELATED APPLICATIONS

This application claims priority to the European Application No. 04030318.2, filed Dec. 21, 2004 which is incorporated by reference herein in its entirety.

The invention relates to a system and a method for providing specifications for a project, in particular for an engineering project for creating an automation solution.

BACKGROUND OF INVENTION

Complex automation solutions are nowadays often developed in a distributed manner, in other words, various different teams or companies are involved in the development, commissioning, operation and maintenance. Such a separation often already takes place in the development of a plant, whereby several companies work on different parts of the plant. Example: Company A supplies a special machine, Company B supplies the remaining machine parts, Company C issues the HMI system for operating/monitoring the plant, and a further company finally handles the integration. Furthermore, a main contractor instructs the individual contractors and naturally the end customer.

SUMMARY OF INVENTION

An engineering system provides the creator or project planner with a huge range of possibilities to achieve his/her tasks. One powerful controller (SPS) or a number of smaller controllers are used for a machine for instance. The naming of variables or program parts is completely free. Essentially the use of plant resources, i.e. IP addresses, can also be freely assigned.

On the other hand, the customer/main contractor has a considerable interest in restricting these degrees of freedom. Possible reasons for this are for example as follows;

All sub-projects are to comply with a common naming scheme, so that the service personal can find their way around all sub-plants.

The allocation of system resources, for instance IP addresses, follows a common scheme so as to avoid conflicts as early as possible during the integration of sub-projects into the overall solution.

The spectrum of used hardware components should be as small and uniform as possible, in order to structure the stocks of spares held as cost effectively as possible.

The customer/main contractor thus often provide their suppliers and subcontractors with instructions demonstrating how certain aspects of the engineering are to be carried out.

Nowadays the above-mentioned rules are exchanged between the companies as documents. Compliance with the rules is incumbent on the individual engineers; the end customer/main contractor can only manually monitor the compliance.

An object of the present invention is thus to specify a system and a method, with the aid of which a simple provision of specifications to be applied is enabled for a project.

The object is achieved by a system for providing specifications for a project, in particular for an engineering project for creating an automation solution, with first means for creating a file containing the specifications and at least one project environment for creating a solution on the basis of the specifications, with the file containing the specifications being imported as meta knowledge in the at least one project environment.

The object is further achieved by a method for providing specifications for a project, in particular for an engineering project for creating an automation solution, in which a file containing the specifications is created in particular by a customer and a solution is created on the basis of the specifications, with the file containing the specifications being imported as meta knowledge in at least one project environment.

The invention is based on the knowledge that project execution is made considerably easier if an option already exists for specifying relevant rules or restrictions for a project, since individual subprojects can work on the basis of the specifications without documents having to be continually consulted to determine how the specifications look. Similarly a restriction, based on the specifications or existing elements or components based for instance on the specifications, or the attributes made available by the elements can be imposed.

Furthermore, a test algorithm based on the specifications can be likewise started by a user of the project environment at a specific time, said test algorithm subsequently providing a list with the non-compliances with the specifications present in the project. The non-compliances can be corrected on the basis of the list.

The system according to the invention allows specifications or rules and restrictions to be updated in a more rapid and simpler manner.

The engineering system advantageously aids with the compliance with or control of the rules. This achieves a higher quality in the project, thereby resulting in lower costs or project outlays.

Furthermore, the quality of the overall solution is improved, whereby an indirect cost saving is achieved.

Further advantageous embodiments of the invention are specified in the dependent claims.

BRIEF DESCRIPTION OF THE DRAWINGS

The invention is described and explained below in further detail with reference to the figures, in which;

FIG. 2 shows a schematic representation of the system for providing specifications

DETAILED DESCRIPTION OF INVENTION

Figure 1:
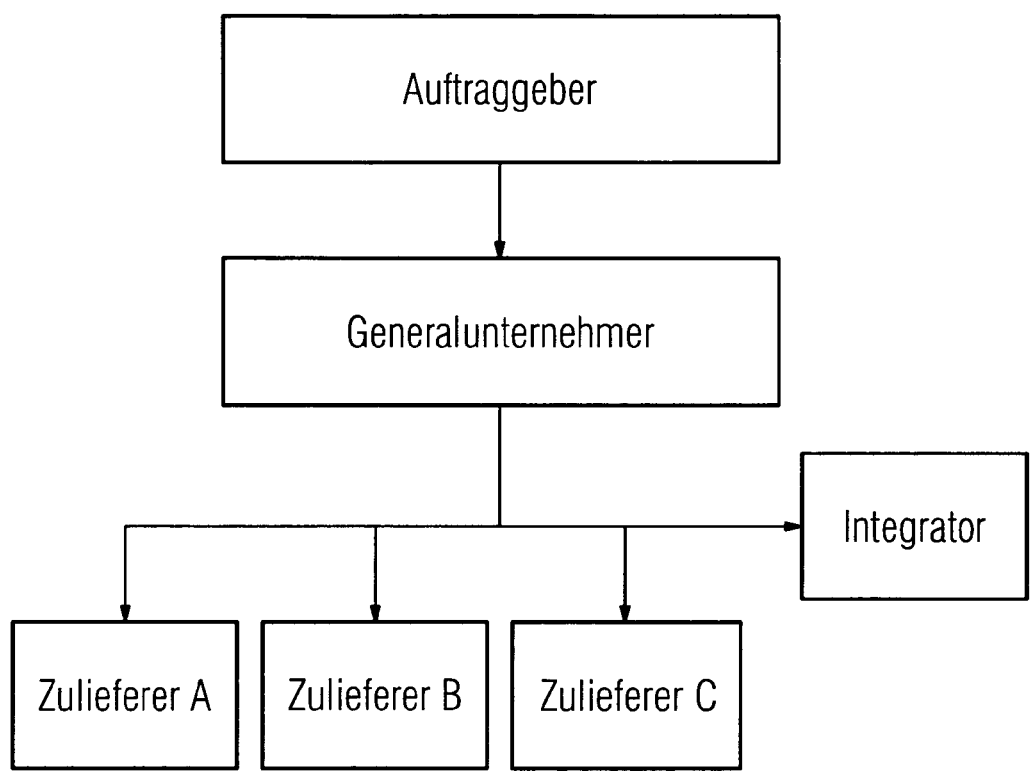
FIG. 1 shows the prior art during the creation of an automation solution.

FIG. 1 shows the normal information flow or the transfer of specifications relevant for a project by a customer or main contractor to the contractors involved, which are active as suppliers or integrators. Specifications relevant for the project are generally issued to the individual parties concerned in the form of documents. The contractors must learn the specifications from the documents and subsequently implement or adhere to thereto. The compliance must be 'manually' checked by means of inspection or test.

FIG. 2 shows a schematic representation of the system according to the invention. Specifications are saved in a file 2 by a customer by means of a formal description via the first means 1. The file 2 with the specifications is imported by one or more project environments 3. Evaluation means 4 for evaluating the specifications are available in the project environment. The specifications are subsequently automatically available for the project within the scope of the project environment. Different specifications can be made available for different subprojects TP1, TP2, TP3. If a test algorithm applied to the already created parts of the solution, is used within the scope of the project, the specifications form the basis for the test algorithm and identified variations of the specifications are shown in a list.

The invention is based on a formal description of the rules.

For this purpose, the customer 6 or the main contractor creates a file 2, which defines the desired restrictions or rules with the aid of a suitable language. These rules can also be detailed further per sub plant, in order to allocate different naming rules for different plant parts. In addition to concrete specifications, the rules can further also contain range definitions, so that a permitted range is defined for a device address (IP address) instead of concrete addresses. Coding rules are also possible, as to which programming languages can be used for example.

The rules file is imported in the engineering tool as so-called meta knowledge. By means of this import, the tool can either exclude the entry of inadmissible configurations from the start (in which the hardware catalog displays correspondingly fewer components for instance), or use it as test algorithms at freely selectable time points. The user then receives a list of non-compliances present and can correspondingly adjust the project planning thereto. The main contractor also does the same. If the plant is accepted, he can carry out his own test algorithms for the project and thus monitor the quality of the data supplied.

If the rules are adjusted or expanded during the course of the project, the supplier imports the rules file again.

In a further capacity stage, the concept can also be combined with libraries of the customer/main contractor. In this case, the library elements are expanded by rules relating to their use, e.g. which devices this element may be used on or in which range a parameter can be set.

The invention claimed is:

1. A computer-implemented system for providing a list of non-compliances relative to specifications for a project for development of a plant, the plant having sub-plants, to avoid conflicts during integration of sub-projects for the sub-plants into the project, comprising:
   a computer and associated storage wherein the computer comprises a file generator that creates and saves in the associated storage a rules file for a project for development of a plant including specifications for different sub-projects TP1, TP2, . . . TPN of the project, wherein the specifications are rules or restrictions, including
      (a) naming rules for sub-projects in order for the sub-projects to comply with a common naming scheme for variables and program parts,
      (b) a limitation of hardware components available for use to structure spare parts stocking in a cost effective manner, wherein the limitation provides for the fewer components displayed in the hardware catalog to prevent inadmissible hardware configurations during project planning, and
      (c) range definitions for the sub-projects that define a permitted range in which a parameter can be set for system resources and IP addresses,
   wherein the file generator generates different specifications for the different subprojects TP1, TP2, . . . TPN of the project and allocates different naming rules for different sub-plants so that all sub-plants comply with a common naming scheme per sub-plant so as to avoid conflicts during integration of the different sub-projects into the project;
   a plurality of project planning environments for developing the project in a distributed manner, each comprising an engineering tool and an evaluation unit,
      the engineering tool operable on the computer creates a project solution based on the specifications, wherein rules file for each sub-project TP1, TP2, . . . TPN of the project is imported into a respective project planning environment in the form of meta knowledge data; and
   the evaluation unit included in each project planning environment evaluates the rules file,
      wherein the evaluation unit bars the input of non-admissible inputs into the project planning environment based on the naming rules, the limitation of hardware, and the range definitions, and
      further wherein the evaluation unit uses the specifications in the rules file as a test algorithm at freely selectable time points to generate a list of non-compliances relative to the specifications to allow for correction of the non-compliances on the basis of the list; and
   a further test algorithm carried out to monitor the quality of the data supplied by the distributed project planning environments upon acceptance of the project.

2. The system according to claim 1, wherein the project is an engineering project for creating an automation solution.

3. The system according to claim 1, wherein the file is updated and the updated file is imported into the plurality of project planning environments.

4. The system according to claim 1, wherein the specifications are used for supplementing library elements included in a library, the library assigned to a client demanding the specifications.

5. A computer-implemented method of providing a list of non-compliances relative to specifications for a project solution for development of a plant, the plant having sub-plants, to avoid conflicts during integration of sub-projects TP1, TP2, . . . TPN for the sub-plants into the project, comprising:
   generating and saving in storage via a file generator a rules file for a project for development of a plant including specifications, wherein the specifications are rules or restrictions, including
      (a) naming rules for sub-projects in order for the sub-projects to comply with a common naming scheme for variables and program parts,
      (b) a limitation of hardware components available for use to structure spare parts stocking in a cost effective manner, wherein the limitation provides for the fewer components displayed in the hardware catalog to prevent inadmissible hardware configurations during project planning, and
      (c) range definitions for the sub-projects that define a permitted range in which a parameter can be set for system resources and IP addresses,
   wherein the file generator generates different specifications for the different sub-projects TP1, TP2, . . . TPN of the project and allocates different naming rules for different sub-plants so that all sub-plants comply with a common naming scheme per sub-plant so as to avoid conflicts during integration of the different sub-projects into the project;
   importing a rules file for each sub-project TP1, TP2, . . . TPN of the project as meta knowledge into a corresponding one of a plurality of project planning environments for developing the project in a distributed manner, each comprising an engineering tool and an evaluation unit;
   evaluating the rules file by the engineering tool and (a) rejecting inadmissible entries by the engineering tool based on the naming rules, the limitation of hardware, and the range definitions, and (b) using the specifications in the rules file as a test algorithm at freely selectable time points to generate a list of non-compliances relative to the specifications to allow for correction of the non-compliances on the basis of the list; and creating by each engineering tool the project solution based on the specifications using the meta knowledge; and upon acceptance of the project, carrying out a further test algorithm to monitor the quality of the data supplied by the distributed project planning environments.

6. The method according to claim 5, wherein the file is generated by a client ordering the project solution.

7. The method according to one of claim 5, further comprising updating the file and importing the updated file into the plurality of project planning environments.

8. The method according to claim 5, further comprising supplementing library elements by the specifications, the library elements included in a library assigned to a client demanding the specifications.

\* \* \* \* \*